United States Patent
Oh et al.

(10) Patent No.: US 9,936,236 B2
(45) Date of Patent: Apr. 3, 2018

(54) VIDEO PROCESSING METHOD AND VIDEO PROCESSING APPARATUS

(71) Applicant: LG ELECTRONICS INC., Seoul (KR)

(72) Inventors: Hyunmook Oh, Seoul (KR); Jangwoong Park, Seoul (KR); Jongyeul Suh, Seoul (KR); Seungryul Yang, Seoul (KR); Joonhee Yoon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/035,118

(22) PCT Filed: Nov. 21, 2014

(86) PCT No.: PCT/KR2014/011244
§ 371 (c)(1),
(2) Date: May 6, 2016

(87) PCT Pub. No.: WO2015/076608
PCT Pub. Date: May 28, 2015

(65) Prior Publication Data
US 2016/0345040 A1    Nov. 24, 2016

Related U.S. Application Data

(60) Provisional application No. 61/906,900, filed on Nov. 21, 2013.

(51) Int. Cl.
*H04N 7/173*    (2011.01)
*H04N 21/258*    (2011.01)
(Continued)

(52) U.S. Cl.
CPC ..... *H04N 21/25825* (2013.01); *H04N 21/236* (2013.01); *H04N 21/2343* (2013.01);
(Continued)

(58) Field of Classification Search
CPC ................................. H04N 21/25825
See application file for complete search history.

(56) References Cited

U.S. PATENT DOCUMENTS 9,591,257 B2 *    3/2017    Oh ................ H04N 7/0125
2013/0120656 A1 *    5/2013    Wilson ............ G06F 3/1462
348/563

(Continued)

FOREIGN PATENT DOCUMENTS

JP       2013-153410 A    8/2013
KR    10-2013-0041500 A    4/2013
(Continued)

*Primary Examiner* — Gigi L Dubasky
(74) *Attorney, Agent, or Firm* — Birch, Stewart, Kolasch & Birch, LLP

(57) ABSTRACT

The present invention relates to a video processing method and a video processing apparatus. An embodiment of the present invention provides a video processing method comprising the steps of: transmitting display related information on a display device to a source device through an interface; receiving video option information on a UHD video processed according to a video expression function of the display device through the interface; receiving the processed UHD video through the interface; and expressing the received UHD video on the display device.

11 Claims, 12 Drawing Sheets

(51) Int. Cl.
*H04N 21/2343* (2011.01)
*H04N 21/4363* (2011.01)
*H04N 21/236* (2011.01)
*H04N 21/434* (2011.01)
*H04N 21/4402* (2011.01)
*H04N 21/45* (2011.01)
*H04N 7/015* (2006.01)

(52) U.S. Cl.
CPC ..... *H04N 21/434* (2013.01); *H04N 21/43635* (2013.01); *H04N 21/4402* (2013.01); *H04N 21/4516* (2013.01); *H04N 7/015* (2013.01)

(56) References Cited

U.S. PATENT DOCUMENTS

2013/0219072 A1  8/2013  Han et al.
2013/0314495 A1*  11/2013  Chen .................. H04N 13/0048
                                                          348/43
2014/0210847 A1*  7/2014  Knibbeler .............. G09G 5/006
                                                          345/589

FOREIGN PATENT DOCUMENTS

| | | |
|---|---|---|
| KR | 10-1274619 B1 | 6/2013 |
| KR | 10-2013-0095519 A | 8/2013 |
| KR | 10-2013-0101138 A | 9/2013 |
| KR | 10-2013-0110573 A | 10/2013 |
| WO | WO2010/140199 A1 | 12/2010 |
| WO | WO 2012/087860 A1 | 6/2012 |
| WO | WO 2012/153224 A1 | 11/2012 |
| WO | WO 2013/046095 A1 | 4/2013 |
| WO | WO 2013/100986 A1 | 7/2013 |
| WO | WO 2013/138127 A1 | 9/2013 |

* cited by examiner

FIG. 4

| Offset | Value | | | | | | | | Description/Format |
|---|---|---|---|---|---|---|---|---|---|
| 0x00 | 0x14 | | | | | | | | HDR Data Block |
| 0x01 | 7 | 6 | 5 | 4 | 3 | 2 | 1 | 0 | BLOCKRevision and Other Data |
| | _ | _ | _ | _ | _ | 0 | 0 | 0 | REVISION 0 |
| | 0 | 0 | 0 | 0 | 0 | _ | _ | _ | RESERVED(BLOCK SPECIFIC) |
| 0x02 | | | | | | | | | Number Of Payload Bytes |
| 0x03 | Descriptor | | | | | | | | Control option flag |
| 0x04 0x05 | Descriptor | | | | | | | | Sink Device Dynamic Range |

FIG. 5

| Offset | Value | | | | | | | | Description/Format |
|---|---|---|---|---|---|---|---|---|---|
| 0x03 | 7 | 6 | 5 | 4 | 3 | 2 | 1 | 0 | Control Option Flag |
| | 1 | _ | _ | _ | _ | _ | _ | _ | Activate HDR processing in source device |
| | _ | 1 | _ | _ | _ | _ | _ | _ | Activate WCG processing in source device |
| | _ | _ | reserved | | | | | | Reserved |

FIG. 6

| Control option flag | description | Details |
|---|---|---|
| 00000000 | No change | Source device does not perform any processing |
| 10000000 | Source device (HDR) | Option of processing only HDR in source device |
| 01000000 | Source device (WCG) | Option of processing only WCG in source device |
| 11000000 | Source device | Source device processes both on the basis of information delivered from sink device (initial value) |

FIG. 7

| Offset | Value | | | | | | | | Description/Format |
|---|---|---|---|---|---|---|---|---|---|
|  | 7 | 6 | 5 | 4 | 3 | 2 | 1 | 0 | Sink Device Dynamic Range |
| 0x04 | 0x00 -> 0xFF | | | | | | | | Lowest Brightness level of Sink device (higher 8 bits) |
| 0x05 | 1 | | | | | | | | Lowest Brightness level of Sink device (LSB) |
|  |  | 0x00 -> 0x3F | | | | | | | Highest Brightness level of Sink device (total 7 bits) |

FIG. 8

| Offset | Value | | | | | | | | Description/Format | |
|---|---|---|---|---|---|---|---|---|---|---|
| 00h | 00h | | | | | | | | DISPLAY PARAMETERS DATA BLOCK | TAG |
| 01h | 7 | 6 | 5 | 4 | 3 | 2 | 1 | 0 | BLOCK Revision and Other Data | |
| | _ | _ | _ | _ | _ | 0 | 0 | 0 | REVISION '0' | VALUES 0 → 7 |
| | 0 | 0 | 0 | 0 | 0 | _ | _ | _ | RESERVED | |
| 02h | 0Ch | | | | | | | | Number of Payload Bytes in BLOCK | 12 |
| 03h 04h | DESCRIPTOR | | | | | | | | Horizontal image size | |
| 05h 06h | DESCRIPTOR | | | | | | | | Vertical image size | |
| 07h 08h | DESCRIPTOR | | | | | | | | Horizontal pixel count | |
| 09h 0Ah | DESCRIPTOR | | | | | | | | Vertical pixel count | |
| 0Bh | DESCRIPTOR | | | | | | | | Feature Support Flags | |
| 0Ch | DESCRIPTOR | | | | | | | | Transfer Characteristic Gamma | |
| 0Dh | DESCRIPTOR | | | | | | | | Aspect Ratio | |
| 0Eh | DESCRIPTOR | | | | | | | | Color Bit Depth | |

| Offset | Value | | | | | | | | Description/Format |
|---|---|---|---|---|---|---|---|---|---|
| 0x0F | 7 | 6 | 5 | 4 | 3 | 2 | 1 | 0 | Control Option Flag |
| | 1 | _ | _ | _ | _ | _ | _ | _ | Activate HDR processing in source device |
| | _ | 1 | _ | _ | _ | _ | _ | _ | Activate WCG processing in source device |
| | _ | _ | reserved | | | | | | Reserved |
| | 7 | 6 | 5 | 4 | 3 | 2 | 1 | 0 | Sink Device Dynamic Range |
| 0x10 | 0x00 -> 0xFF | | | | | | | | Lowest Brightness level of Sink device (higher 8 bits) |
| 0x11 | 1 | _ | _ | _ | _ | _ | _ | _ | Lowest Brightness level of Sink device (LSB) |
| | _ | 0x00 -> 0x3F | | | | | | | Highest Brightness level of Sink device (total 7 bits) |

FIG. 9

| Offset | Value | | | | | | | | Description/Format | |
|---|---|---|---|---|---|---|---|---|---|---|
| 00h | 0Ch | | | | | | | | DISPLAY DEVICE DATA BLOCK | TAG |
| 01h | 7 | 6 | 5 | 4 | 3 | 2 | 1 | 0 | BLOCK Revision and Other Data | |
| | _ | _ | _ | _ | 0 | 0 | 0 | 0 | REVISION '0' | VALUES 0 — 7 |
| | 0 | 0 | 0 | 0 | 0 | _ | _ | _ | RESERVED | |
| 02h | 0Dh | | | | | | | | Number of Payload Bytes in BLOCK | 13 |
| 03h | DESCRIPTOR | | | | | | | | Display Device Technology | |
| 04h | DESCRIPTOR | | | | | | | | Device operating mode | |
| 05h→08h | DESCRIPTOR | | | | | | | | Devoce native pixel format | |
| 09h→0Ah | DESCRIPTOR | | | | | | | | Aspect ratio and orientation | |
| 0Bh | DESCRIPTOR | | | | | | | | Sub-pixel layout / configuration / shape | |
| 0Ch→0Dh | DESCRIPTOR | | | | | | | | Horizontal and vertical dot / pixel pitch | |
| 0Eh | DESCRIPTOR | | | | | | | | Color bit depth | |
| 0Fh | DESCRIPTOR | | | | | | | | Response time | |

| Offset | Value | | | | | | | | Description/Format |
|---|---|---|---|---|---|---|---|---|---|
| 0x0F | 7 | 6 | 5 | 4 | 3 | 2 | 1 | 0 | Control Option Flag |
| | 1 | _ | _ | _ | _ | _ | _ | _ | Activate HDR processing in source device |
| | _ | 1 | _ | _ | _ | _ | _ | _ | Activate WCG processing in source device |
| | | | | reserved | | | | | Reserved |
| | 7 | 6 | 5 | 4 | 3 | 2 | 1 | 0 | Sink Device Dynamic Range |
| 0x10 | 0x00 -> 0xFF | | | | | | | | Lowest Brightness level of Sink device (higher 8 bits) |
| 0x11 | 1 | _ | _ | _ | _ | _ | _ | _ | Lowest Brightness level of Sink device (LSB) |
| | _ | 0x00 -> 0x3F | | | | | | | Highest Brightness level of Sink device (total 7 bits) |

FIG. 10

| | Byte# | Bits 5-7 | Bits 0-4 |
|---|---|---|---|
| Video Data Block | 1 | Video Tag Code | length = total number of video bytes following this byte ($L_1$) |
| | 2 | CEA Short Video Descriptor 1 | |
| | 3 | CEA Short Video Descriptor 2 | |
| | ... | ... | |
| | $1+L_1$ | CEA Short Video Descriptor $L_1$ | |
| Audio Data Block | $2+L_1$ | Audio Tag Code | length = total number of audio bytes following this byte ($L_2$) |
| | $3+L_1$ | CEA Short Audio Descriptor 1 | |
| | $4+L_1$ | | |
| | $5+L_1$ | | |
| | ... | | |
| | $L_1+L_2$ | | |
| | $1+L_1+L_2$ | CEA Short Audio Descriptor $L_2$ / 3 | |
| | $2+L_1+L_2$ | | |
| Speaker Allocation Data Block | $3+L_1+L_2$ | Speaker Allocation Tag Code | length = total number of Speaker Allocation bytes following this byte ($L_3$ = 3) |
| | $4+L_1+L_2$ | Speaker Allocation Data Block Payload (3 bytes) | |
| | $5+L_1+L_2$ | | |
| | $6+L_1+L_2$ | | |
| Vendor-Specific Data Block | $7+L_1+L_2$ | Vendor-Specific Tag Code | length = total number of Vendor-Specific bytes following this byte ($L_4$) |
| | $8+L_1+L_2$ | IEEE OUI third two hex digits | |
| | $9+L_1+L_2$ | IEEE OUI second two hex digits | |
| | $10+L_1+L_2$ | IEEE OUI first two hex digits | |
| | ... | Vendor-Specific Data Block Payload ($L_4$ -3 bytes) | |
| Video Capability Data Block | $8+L_1+L_2+L_4$ | Extended Tag Code | length = total number of bytes in this block following this byte ($L_5$) |
| | $9+L_1+L_2+L_4$ | Video Capabilities Ext. Tag Code = 00h | |
| | $10+L_1+L_2+L_4$ | Video Capabilities Data Bye 3 (see Section 7.5.6) | |
| Dynamic Range | $11+L_1+L_2+L_4+L_5$ | Dynamic range Tag Code | length = total number of bytes in this block following this byte ($L_6$ = 3) |
| | $12+L_1+L_2+L_4+L_5$ | Lowest Brightness level of Sink device (higher 8 bits) | |
| | $13+L_1+L_2+L_4+L_5$ | Lowest Brightness level of Sink device (LSB) | |
| | $14+L_1+L_2+L_4+L_5$ | Highest Brightness level of Sink device (total 7 bits) | |

FIG. 11

| InfoFrame Type Code | InfoFrame Type = 0x07 (UHDInfoFrame) | | | | | | | |
|---|---|---|---|---|---|---|---|---|
| InfoFrame Version Number | Version = 0x00 | | | | | | | |
| Length of HDRInfoFrame | Length of HDRInfoFrame () | | | | | | | |
| Data Byte 1 | P3 | P2 | P1 | P0 | R2 | R1 | R0 | E0 |
| Data Byte 2 | black_luminance_level (highest 8 bits) | | | | | | | |
| Data Byte 3 | black_lu minance level (lower 1 bit) | white_luminance_level (7 bits) | | | | | | |
| Data Byte 4 | Orig_black_luminance_level (highest 8 bits) | | | | | | | |
| Data Byte 5 | Orig_bla ck_lumi nance_l evel (lower 1 bit) | Orig_white_luminance_level (7 bits) | | | | | | |
| Data Byte 6 | Orig_color_gamut | | | | S3 | S2 | S1 | S0 |
| Data Byte 7 | Red-x low bits | | Red-y low bits | | Green-x low bits | | Green-y low bits | |
| Data Byte 8 | Blue-x low bits | | Blue-x low bits | | White-x low bits | | White-y low bits | |
| Data Byte 9 | Red-x high bits | | | | | | | |
| Data Byte 10 | Red-y high bits | | | | | | | |
| Data Byte 11 | Green-x high bits | | | | | | | |
| Data Byte 12 | Green-y high bits | | | | | | | |
| Data Byte 13 | Blue-x high bits | | | | | | | |
| Data Byte 14 | Blue-y high bits | | | | | | | |
| Data Byte 15 | White-x high bits | | | | | | | |
| Data Byte 16 | White-y high bits | | | | | | | |

FIG. 12

| post_processing_type | description | Details |
|---|---|---|
| 0000 | No change | Source device does not perform any processing |
| 0001 | Dynamic Range mapping | Signal dynamic range mapping |
| 0010 | Gamut mapping | Signal gamut range mapping |
| 0011 | Source device | Source device processes both on the basis of information delivered from sink device (initial value) |
| 0011-1000 | reserved | This can be used for information exchange between sink and source for FRC and multilayer video enhancement function in the future |
| 1001-1111 | User private | |

FIG. 13

| Orig_color_gamut | description |
|---|---|
| 0000 | REC. 709 |
| 0001 | BT. 2020 NCL |
| 0010 | xvYCC |
| 0011 | DCI-P3 |
| 0100 | Adobe RGB |
| 0101 | BT. 2020 CL |
| 0110 ~ 1111 | reserved |

FIG. 14

| InfoFrame Type Code | InfoFrame Type = 0×02 | | | | | | |
|---|---|---|---|---|---|---|---|
| InfoFrame Version Number | Version = 0×02 or [0×03] | | | | | | |
| Length of AVI InfoFrame | Length of AVI InfoFrame (16) | | | | | | |
| Data Byte 1 | [Y2] | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | [VIC7] | VIC6 | VIC5 | VIC4 | VIC3 | VIC2 | VIC1 | VIC0 |
| Data Byte 5 | VQ1 | VQ2 | CN1 | CN0 | PR3 | PR2 | PR1 | PR0 |
| Data Byte 6 | ETB07-ETB00 (Line Number of End of Top Bar - lower 8 bits) | | | | | | |
| Data Byte 7 | ETB15-ETB08 (Line Number of End of Top Bar - upper 8 bits) | | | | | | |
| Data Byte 8 | SBB07-SBB00 (Line Number of Start of Bottom Bar - lower 8 bits) | | | | | | |
| Data Byte 9 | SBB15-SBB08 (Line Number of Start of Bottom Bar - upper 8 bits) | | | | | | |
| Data Byte 10 | ELB07-ELB00 (Pixel Number of End of Left Bar - lower 8 bits) | | | | | | |
| Data Byte 11 | ELB15-ELB08 (Pixel Number of End of Left Bar - upper 8 bits) | | | | | | |
| Data Byte 12 | SRB07-SBB00 (Pixel Number of Start of Right Bar - lower 8 bits) | | | | | | |
| Data Byte 13 | SRB15-SBB08 (Pixel Number of Start of Right Bar - upper 8 bits) | | | | | | |
| Data Byte 14 | P3 | P2 | P1 | P0 | R2 | R1 | R0 | E0 |
| Data Byte 15 | black_luminance_level (highest 8 bits) | | | | | | |
| Data Byte 16 | black_luminance_level(lower 1 bit) | white_luminance_level (7 bits) | | | | | |
| Data Byte 17 | Orig_black_luminance_level (highest 8 bits) | | | | | | |
| Data Byte 18 | Orig_black_luminance_level(lower 1 bit) | Orig_white_luminance_level (7 bits) | | | | | |
| Data Byte 19 | Orig_color_gamut | | | S3 | S2 | S1 | S0 |
| Data Byte 20 | Red-x low bits | | Red-y low bits | | Green-x low bits | | Green-y low bits |
| Data Byte 21 | Blue-x low bits | | Blue-y low bits | | White-x low bits | | White-y low bits |
| Data Byte 22 | Red-x high bits | | | | | | |
| Data Byte 23 | Red-y high bits | | | | | | |
| Data Byte 24 | Green-x high bits | | | | | | |
| Data Byte 25 | Green-y high bits | | | | | | |
| Data Byte 26 | Blue-x high bits | | | | | | |
| Data Byte 27 | Blue-y high bits | | | | | | |
| Data Byte 28 | White-x high bits | | | | | | |
| Data Byte 29 | White-y high bits | | | | | | |

VIDEO PROCESSING METHOD AND VIDEO PROCESSING APPARATUS

CROSS REFERENCE TO RELATED APPLICATIONS

This application is the National Phase of PCT/KR2014/011244 filed on Nov. 21, 2014, which claims priority under 35 U.S.C. 119(e) to U.S. Provisional Application No. 61/906,900 filed on Nov. 21, 2013, all of which are hereby expressly incorporated by reference into the present application.

TECHNICAL FIELD

The present invention relates to a video processing method and a video processing apparatus.

BACKGROUND ART

With the increase of a video signal processing speed, ultra-high definition (UHD) video encoding/decoding schemes are under study.

UHD content aims to provide improved image quality in various aspects. To this end, UHD video elements are under study and development in various fields including broadcasting. There is increasing demand for enhanced viewer experience with respect to colors and brightness which were not provided by previous content.

Accordingly, efforts to provide high definition images by extending presentation ranges of colors and brightness from among various elements constituting UHD video have continued.

UHD display devices are discriminated from conventional display devices in color and brightness presentation.

However, technology for viewing UHD content through various display devices in an optimal environment has not been developed.

For example, when UHD content is provided while next-generation display devices are being propagated, users cannot fully enjoy the UHD content due to color or brightness restrictions according to physical characteristics of the display devices.

To adapt colors and brightness of content to a display device, the content needs to be converted on the basis of accurate analysis of characteristics of the display device. However, if UHD content is provided through a device outside of the display device, the characteristics of the display device are restrictively delivered.

DISCLOSURE

Technical Problem

An object of the present invention is to provide a video processing method and a video processing apparatus for viewing content including UHD content through various display devices in an optimal environment.

Another object of the present invention is to provide a video processing method and a video processing apparatus for reducing restrictions on expression of colors and brightness of content including UHD content according to physical characteristics of various display devices when the content is displayed through the display devices.

Yet another object of the present invention is to provide a video processing method and a video processing apparatus for viewing content including UHD content in an optimal environment by delivering characteristics of a display device even when the content is provided through a device outside of the display device.

Technical Solution

According to an embodiment of the present invention provides a video processing method, including: transmitting display related information on a display device to a source device through an interface; receiving video option information on UHD video processed according to a video display function of the display device through the interface; receiving the processed UHD video through the interface; and displaying the received UHD video on the display device.

The display related information may include display option information according to the video display function of the display device. The display option information may include information for controlling processing of the source device or brightness information of the display device.

The video option information may include brightness processing information of the processed UHD video or color gamut conversion information of the UHD video.

Another embodiment of the present invention provides a video processing apparatus, including: a metadata processor for transmitting display related information on a display device to a source device through an interface; a controller for receiving video option information on a UHD video processed according to a video display function of the display device through the interface; and a display panel controller for controlling the processed UHD video to be received through the interface and for controlling the received UHD video to be displayed on the display device.

Another embodiment of the present invention provides a video processing apparatus, including: a decoder for decoding encoded UHD video; a metadata processor for receiving display related information on a display device through an interface; a video processor for processing the decoded UHD video according to a video display function of the display device; and an option controller for transmitting video option information on the UHD video processed according to the video display function of the display device to a sink device through the interface.

Another embodiment of the present invention provides a video processing method, including: decoding encoded UHD video; receiving display related information on a display device through an interface; processing the decoded UHD video according to a video display function of the display device; and transmitting video option information on the UHD video processed according to the video display function of the display device to a sink device through the interface.

Advantageous Effects

According to embodiments of the present invention, it is possible to view content including UHD content through various display devices under an optimal environment.

According to embodiments of the present invention, it is possible to reduce restrictions on expression of colors and brightness of content including UHD content according to physical characteristics of various display devices, when the content is displayed through the display devices.

According to embodiments of the present invention, it is possible to view content including UHD content under an optimal environment by delivering characteristics of a display device even when the content is provided through a device outside of the display device.

DESCRIPTION OF DRAWINGS

FIG. 4 is a table showing exemplary information delivered from the sink device to the source device according to an embodiment of the present invention.

FIG. 5 is a table showing field values of exemplary information delivered from the sink device to the source device according to an embodiment of the present invention.

FIG. 6 is a table showing a control option flag according to an embodiment of the present invention.

FIG. 7 is a table showing sink device dynamic range information according to an embodiment of the present invention.

FIG. 8 is a table showing a display parameters data block of DisplayID as display related information delivered from the sink device to the source device according to an embodiment of the present invention.

FIG. 9 is a table showing a display device data block as display related information described in an embodiment of the present invention.

FIG. 10 illustrates another example of delivering display related information from the sink device to the source device according to an embodiment of the present invention.

FIG. 11 is a table showing information to be delivered from the source device to the sink device according to an embodiment of the present invention.

FIG. 12 is a table showing post processing type information according to an embodiment of the present invention.

FIG. 13 is a table showing original color gamut information according to an embodiment of the present invention.

FIG. 14 illustrates an example of delivering color information of a video sent from the source device to the sink device according to an embodiment of the present invention.

BEST MODE

Figure 1:
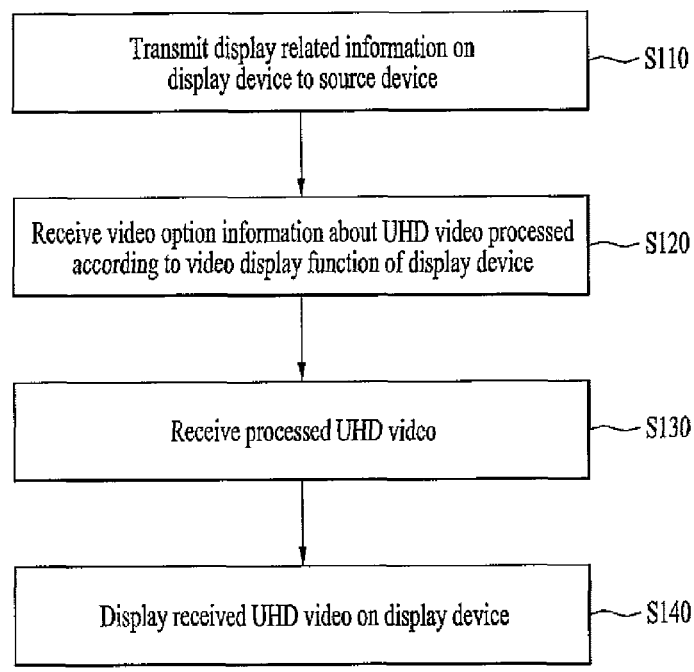
FIG. 1 is a flowchart illustrating a video processing method according to an embodiment of the present invention.

FIG. 1 is a flowchart illustrating a video processing method according to an embodiment of the present invention.

A description will be given of a video processing method of a sink device according to an embodiment of the present invention.

The sink device sends display related information about a display device to a source device (S110). The display related information is information about a video presentation function of the display device and may include color gamut information or brightness related information of the display device, which will be described in detail later.

The sink device receives video option information about a UHD video processed according to the video display function of the display device (S120). The video option information may include color gamut information, dynamic range information and post-processing information of the processed UHD video. The video option information will be described in detail later with reference to FIGS. 11 to 14.

The sink device receives the processed UHD video (S130).

The sink device displays the received UHD video through the display device (S140).

The video processing method according to the present embodiment may transmit display option information about processing of the UHD video such that the display device appropriately displays the UHD video, which is not shown in the figure. The display option information may conform to examples shown in FIGS. 4 to 10 and other detailed examples will be described below. As described above, the sink device can transmit the display option information for controlling video processing of the source device, and the display option information for display can also be included in the display related information.

Figure 2:
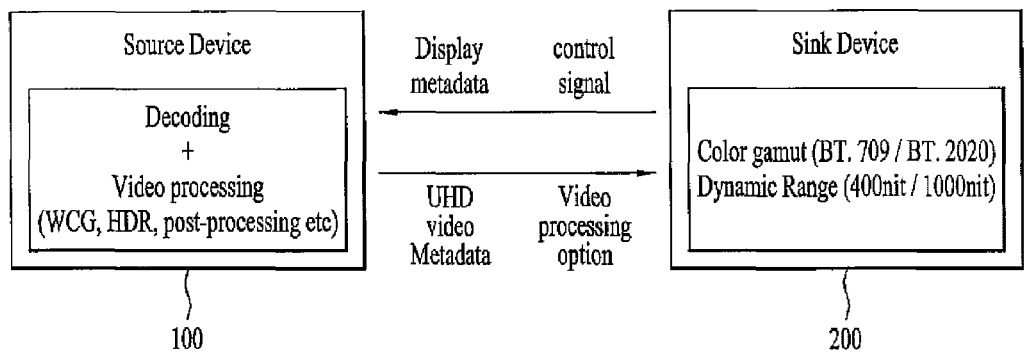
FIG. 2 illustrates an example of connecting a source device and a sink device for video transmission and reception.

FIG. 2 illustrates an example of connecting a source device and a sink device for video image transmission and reception. In FIG. 2, information exchange between the source device which can decode an image and process the definition of the image and the sink device which can output the image is performed as follows.

The source device 100 refers to a device for decoding images received through various paths such as broadcasting, storage media such as Blu-ray, UV (ultraviolet), SCSA (Secure Content Storage Association), and IP (Internet Protocol) streaming or a device capable of performing video processing. For example, a set-top box, a player of a storage medium, such as a Blu-ray disc (BD) player, and a computer correspond to the source device 100.

Video processing of the source device 100 may include definition change processing such as WCG (Wide Color Gamut) processing, HDR (High Dynamic Range) processing other types of post processing. In this case, the source device 100 determines whether a corresponding video source can be played through a corresponding display device on the basis of display information provided by the sink device, for example, color gamut information or dynamic range information, and converts the video source into a video having definition suitable for playback as necessary, rather than uniformly performing video processing on videos.

When the sink device 200 needs to control video processing of the source device 100, the sink device 200 can be provided with information about video processing performed by the source device 100.

The source device 100 may receive display related meta information or display option information from the sink device 200. The source device 100 may provide UHD video metadata and processing option information of the processed video to the sink device 200 on the basis of the received information. The sink device 200 may display the video processed by the source device 100 on the basis of the data or information provided by the source device 100. The sink device 200 may display the video processed by the source device 100 within the range of color gamut information or dynamic range suitable for the corresponding display device.

Figure 3:
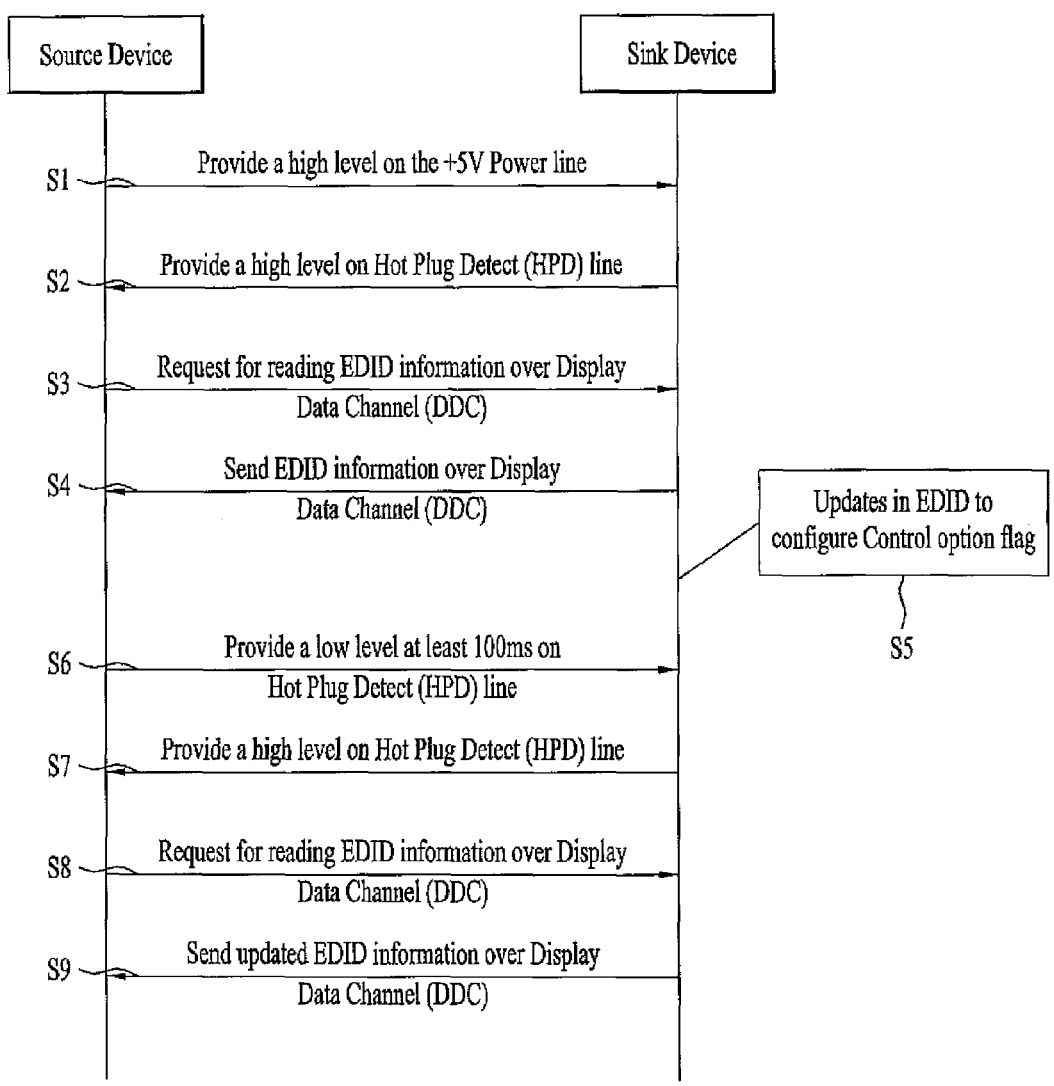
FIG. 3 illustrates information transmission and reception when a source device is connected to a sink device according to an embodiment of the present invention.

FIG. 3 illustrates transmission and reception of information when the source device is connected to the sink device according to an embodiment of the present invention.

In the present embodiment, the source device is connected to the sink device through a wired interface such as HDMI or DisplayPort. When the source device and the sink device are connected through the wired interface, the sink device 200 controls (activates or deactivates) HDR and WCG functions of the source device 100 through a data block of HDR of EDID (Extended Display Identification Data) and the source device reads changed EDID of the sink device using the HDR and WCG functions controlled by the sink device.

Upon connection of the source device to the sink device through the wired interface, the source device provides a high level voltage to a +5V power line of the wired interface and the sink device confirms connection of the source device thereto through the high level voltage (S1).

The sink device notifies the source device that connection to the sink device is completed and display related information such as EDID is ready to be read by applying a high level voltage to a hot plug detect line at a low level voltage (S2).

The source device checks the hot plug detect line transited from the low level voltage to the high level voltage and sends a request for reading the display related information to the sink device through a display data channel (S3). The sink device sends the display related information to the source device through the display data channel (S4).

When a corresponding field of a control option flag of the HDR data block of the display related information is changed at the request of a user or according to functional determination of the sink device (S5), the sink device provides a low level voltage to the hot plug detect line for a predetermined time, e.g., at least 100 ms, in order to inform the source device of updated display related information (S6).

When the source device can read the display related information, the sink device applies a high level voltage to the hot plug detect line (S7) and the source device senses the high level voltage applied to the hot plug detect line and sends a request for reading the display related information through the display data channel (S8). Then, the sink device sends the updated display related information through the display data channel (S9).

A description will be given of an example of information exchange between the source device and the sink device on the basis of the aforementioned operation according to an embodiment of the present invention.

According to an embodiment of the present invention, the sink device may send color gamut information and brightness information to the source device in response to the request of S3 or S8 (this operation is included in S4 or S9).

The color gamut information may include color primary coordinates on CIE xy diagram which is a color gamut corresponding to RGBW or color gamut information such as BT. 709 or BT. 2020. The color gamut information may be delivered through a color characteristics data block of DisplayID defined in the interface. The brightness information may include a maximum brightness value and a minimum brightness value. According to the example of the present embodiment, the brightness information can be delivered using a data block defined in DisplayID, EDID or EDID extension information of the interface.

The source device determines whether color information or brightness information of the corresponding video needs to be adjusted on the basis of the display related information sent thereto. If the source device determines that the color information or brightness information needs to be adjusted, the source device may change the color or brightness information on the basis of color mapping or dynamic range mapping information provided by the video or the source device itself may provide color or brightness information of the video.

The source device delivers the final video having the adjusted color and brightness information to the sink device. Here, the source device can deliver color gamut or dynamic range related metadata about the final video through InfoFrame of the interface. In the case of the color gamut information, existing color gamut information (e.g., BT. 709, BT. 2020 or the like) defined in AVI InfoFrame of the interface can be delivered. In the case of the dynamic range related information, maximum or minimum brightness information can be delivered. The dynamic range related information may be delivered through a method of defining new InfoFrame or extending AVI InfoFrame through methods described in embodiments.

If the source device needs to provide information about video processing performed thereby when delivering the final video, the source device may deliver processing information of a video processing unit, such as HDR information or WCG information, using post_processing_type included in InfoFrame through methods described in embodiments. Furthermore, when a color conversion function such as a new electro-optical transfer function (EOTF) has been defined and used or needs to be used with respect to the HDR information for the final video, the source device may deliver information about the new color conversion function using a flag of interface information.

The sink device determines whether processing of the source device for the final video is appropriate and determines whether the source device needs to be controlled on the basis of feedback on the determination of whether processing of the source device is appropriate. In this case, the sink device can control the source device through the control option flag included in the data block defined in DisplayID, EDID and EDID extension information described in the embodiments. If the video processing result of the source device, such as WCG information or HDR information, is appropriate, the sink device can control the source device to continue the same video processing by activating bits related to the WCG information or HDR information.

If the video processing of the source device is inappropriate, the sink device can control the source device not to use video processing currently performed by the source device by deactivating the bits related to the WCG information or HDR information.

When information delivered through the control option flag does not correspond to video processing currently performed by the source device, the sink device changes the video processing on the basis of the information included in the control option flag. When UHD video metadata is changed with respect to the changed video processing, the sink device may change color characteristics information and brightness information in InfoFrame and update post_processing_type such that post_processing_type is adapted to the changed video processing. Subsequently, S5 is performed.

A description will be given of information delivered from the sink device to the source device.

According to an embodiment of the present invention, when the source device processes HDR related information, the source device can perform video processing suitable for the sink device on the basis of information reproducible by the sink device. In this case, the sink device can send, to the source device, appropriate information about a display brightness range, for example, a sink black luminance level and a sink white luminance level, and a flag for controlling post processing of the source device. Here, a data block of DisplayID, EDID or EDID extension information can be used, which will be described in detail below.

FIG. 4 illustrates exemplary information delivered from the sink device to the source device according to an embodiment of the present invention.

FIG. 4 shows an example of information delivered from the sink device to the source device using a data block of DisplayID.

FIG. 4 shows an offset field and a value field of the data block of DisplayID, and description and format thereof. For example, when the offset filed of the data block of DisplayID is 0x00 and the value field thereof is 0x14, the fields can indicate an HDR data block.

As shown in FIG. 4, when the offset field is 0x03, the offset field can indicate a flag (control option flag) for controlling post processing of the source device. Values of the flag will be described in detail later.

When the offset field is 0x004 or 0x05, the offset field can deliver information about brightness values (a sink black luminance level, a sink white luminance level, etc.) that can be expressed by the sink device.

The data block of DisplayID may further include information necessary for video processing according to the offset field value. For example, when the offset field is 0x03, the data block can deliver information about HDR related post processing using the current reserved field.

The offset field value or the value field value are arbitrary values and can be changed. The control option flag and display information of the sink device will be described in detail below.

FIG. 5 is a table showing exemplary information delivered from the sink device to the source device according to an embodiment of the present invention. FIG. 5 shows field values of the aforementioned embodiment.

The control option flag of the data block of DisplayID, which is information delivered from the sink device to the source device, is a field which controls (on/off) post processing performed by the source device. According to an embodiment of the present invention, various options which will be provided through the interface of the source device and the sink device can be indicated using the control option flag. FIG. 5 shows HDR and WCG related options.

When the offset field of the data block of DisplayID is 0x03, the offset field can indicate the control option flag capable of controlling the source device, as described above. HDR processing or WCG processing of the source device can be activated according to bit position of the value field. In this example, lower two bits represent information about activation of HDR processing and information about WCG processing.

The fields described in the present embodiment may be signaled at the request of a user or controlled by functional determination of the sink device (when processing capability of the sink device is higher). In the present embodiment, information exchange between the sink device and the source device for frame rate control (FRC) and multilayer video enhancement may be performed using reserved bits. Here, the offset field or the value field is an arbitrary value and can be changed.

FIG. 6 is a table showing the control operation flag according to an embodiment of the present invention in detail.

Information for controlling HDR and WCG performed in the source device may be respectively set to lower 2 bits of the value field indicating the control option flag. Two combinations of the control option flag may be used as follows.

In an example, when the value field is 00000000, this indicates that the source device does not perform any processing. For example, when the value field is 10000000, this indicates information about HDR processing of the source device. In this case, the value field can indicate an option of processing only HDR in the source device. In another example, when the value field is 01000000, this indicates information about WCG processing of the source device. This value field can indicate an option of processing only WCG in the source device.

In another example, when the value field is 11000000, this indicates control option information for enabling the source device to process both HDR and WCG on the basis of information delivered from the sink device. This value may be used as an initial value.

FIG. 7 is a table showing sink device dynamic range information according to an embodiment of the present invention.

As shown in FIG. 7, the sink device may deliver dynamic range information thereof to the source device using a data block of DisplayID to notify the source device of information on brightness that can be expressed by the sink device.

The dynamic range information of the sink device refers to maximum and minimum physical brightness values (in nit or $cd/m^2$) for expressing a dynamic range which can be expressed through a display of the sink device.

For example, the dynamic range information of the sink device is indicated using an offset field value of 0x04 or 0x05 of the data block of DisplayID.

In this example, when the offset field of the data block of DisplayID is 0x04, the lowest brightness level of the sink device can be indicated using higher 8 bits rather than lower 8 bits.

When the offset field of the data block of DisplayID is 0x05, the lowest brightness level of the sink device can be indicated using the least significant bit of the value field and the highest brightness level of the sink device can be indicated using the remaining bits of the value field.

Here, the offset field or the value field is an arbitrary value and can be changed.

Minimum brightness information (sink_black_luminance_level) and maximum brightness information (sink_white_luminance_level) of the sink device, which can be indicated using the offset field and the value field, may be represented as follows.

For example, sink_black_luminance_level of the sink device is a value for indicating lowest brightness that can be expressed by the display and can be represented in units of 0.0001 for the range of 0 to 0.05 in consideration of normal lowest brightness. That is, when physical brightness of the display is brightness_black ($cd/m^2$), actual lowest brightness can be calculated from sink_black_luminance_level as follows.

$$\text{Brightness\_black} = \text{sink\_black\_luminance\_level} \times 10000$$

($0 \leq \text{sink\_black\_luminance\_level} \leq 500 < 2^9$)

For example, a reference monitor has lowest reference brightness of 0.05 $cd/m^2$ and can deliver 500 obtained by multiplying the lowest reference brightness by 10000 (decimal).

Sink_white_luminance_level of the sink device is a value for indicating highest brightness that can be expressed by the display and can be represented in units of 100 for the range of 100 to 10000 in consideration of normal highest brightness. That is, when physical brightness of the display is brightness_white (cd/m$^2$), actual highest brightness can be calculated from sink_white_luminance_level as follows.

Brightness_white=sink_white_luminance_level×100

(1≤sink_white_luminance_level≤100<2$^7$)

For example, a reference monitor has highest reference brightness of 100 cd/m$^2$ and can deliver 1 obtained by dividing the highest reference brightness by 100 (decimal).

A description will be given of another embodiment of delivering display related information from the sink device to the source device.

FIG. 8 is a table showing a display parameters data block of DisplayID as display related information delivered from the sink device to the source device according to an embodiment of the present invention.

The display parameters data block of DisplayID as display related information may include all parameters of a monitor. As shown in FIG. 8, the display parameters data block may include a horizontal or vertical image size (corresponding to an offset field value of 0x03 or 0x04), a horizontal or vertical pixel count (corresponding to an offset field value of 0x05 or 0x06), flags for functions supportable by the monitor (corresponding to an offset field value of 0x0B), gamma (corresponding to an offset field value of 0x0C) used in a transfer function, a display aspect ratio (corresponding to an offset field value of 0x0D) and a pixel bit depth (corresponding to an offset field value of 0x0E).

According to an embodiment of the present invention, the display parameters data block may include the aforementioned control option flag information and sink device dynamic range information. That is, the sink device can deliver the display parameters data block information including the aforementioned control option flag information and sink device dynamic range information to the source device.

In the present embodiment, when the offset field of the display parameters data block is 0x0F, this can indicate the control option flag. When the offset field is 0x10 or 0x11, this can indicate information about brightness values (sink black luminance level, sink white luminance level, etc.) which can be expressed by the sink device.

The value field for the control option flag when the offset field is 0x0F and the value field for the sink device dynamic range information when the offset field is 0x10 or 0x11 have been described with reference to FIGS. 5, 6 and 7. Here, the offset field and the value field are arbitrary values and can be changed.

According to an embodiment of the present invention, transfer curve information appropriate for HDR can be delivered through transfer characteristic gamma.

A description will be given of another embodiment of delivering display related information from the sink device to the source device.

FIG. 9 is a table showing a display device data block as display related information described in embodiments of the present invention. The present embodiment describes an example of information delivered from the sink device to the source device using the display device data block.

The display device data block includes information which can indicate characteristics of a display panel. The display device data block indicates a display device type (corresponding to an offset field value of 0x03), a display device operating mode (corresponding to an offset field value of 0x04), an image size that can be indicated by pixel count (corresponding to offset field values of 0x05 to 0x08), a display aspect ratio (corresponding to offset field values of 0x09 to 0x0A), a bit depth (corresponding to an offset field value of 0x0E), a response time (corresponding to an offset field value of 0x0F), etc. According to an embodiment of the present invention, control option flag information and sink device dynamic range information of the display panel, shown in FIG. 9, can be delivered along with the display device data block to the source device.

According to the present embodiment, when the offset field of the display device data block is 0x0F, this can indicate the control option flag. When the offset field of the display device data block is 0x10 or 0x11, this can indicate the sink device dynamic range information.

A value of the value field when the offset field of the display device data block is 0x0F and a value of the value field when the offset field of the display device data block is 0x10 or 0x11 may conform to the examples shown in FIGS. 5 to 7 or FIG. 8. Here, the offset field and the value field are arbitrary values and can be changed.

In another example of delivering the display related information from the sink device to the source device, the sink device may deliver the control option flag and sink device dynamic range information using a vendor-specific data block of DisplayID. The vendor-specific data block is data used when the sink device delivers information which is not defined in the data block. The aforementioned control option flag and sink device dynamic range information may be included in the vendor-specific data block and delivered.

In another example of delivering the display related information from the sink device to the source device, the sink device may deliver the display related information using a product identification data block of DisplayID.

The product identification data block of DisplayID may include information about a display device manufacturer, a display device serial number, product ID, etc. When the sink device can check information about each product through a display device manufacturer, product date, product ID, etc., the sink device can deliver dynamic range information corresponding to each product to the source device using the information. According to the present invention, when the product identification data block of DisplayID delivers dynamic range information as product identification information, the control option flag is delivered through one of the aforementioned embodiments.

In another example of delivering the display related information from the sink device to the source device, the sink device may deliver the display related information to the source device using a transfer characteristics data block. The transfer characteristics data block is a data block delivering transfer curve related information of a display. When a gamma function is used or a piecewise linear curve is supported for display, the transfer characteristics data block displays use of the gamma function or support of the piecewise linear curve. Since peak luminance and lowest luminance of a display panel have not defined in the transfer characteristics data block, the sink device can deliver dynamic range information, which is obtained by including the aforementioned control option flag and sink device dynamic range information in the transfer characteristics data block, to the source device.

FIG. 10 illustrates another example of delivering display related information from the sink device to the source device according to an embodiment of the present invention. According to the present embodiment, the sink device can deliver the display related information to the source device using consumer electronics association (CEA) EDID extension information.

The sink device may deliver, to the source device, the CEA EDID extension information including device property information supportable by a CE sink device in addition to EDID defined in VESA of CEA-861. In this case, the sink device can deliver the dynamic range information illustrated in FIG. 10 to the source device.

An extension data block of the CEA EDID extension information may include a video data block, an audio data block, a speaker allocation data block, a vendor-specific data block and a video capability data block. The extension data block includes a predefined tag code in bits #5 to #7 of the first byte of each data block in order to identify the corresponding data block.

According to an embodiment of the present invention, bits #5 to #7 of the first byte of the CEA EDID extension data block may include a tag code indicating dynamic range information.

As shown in FIG. 10, the dynamic range information in the CEA EDID extension data block can be indicated using higher 8 bits of the lowest brightness level of the sink device, the LSB of the lowest brightness level of the sink device and the highest brightness level of the sink device (total 7 bits). Bit allocation is arbitrary and can be changed. Therefore, according to the present invention, the sink device can deliver the highest/lowest brightness level thereof, from among display related information, to the source device using the CEA EDID extension information.

A description will be given of information to be delivered from the source device to the sink device according to an embodiment of the present invention.

The source device may determine whether brightness and color gamut of content are appropriate for the sink device on the basis of display related information and color gamut related information of the sink device and, if required, change the brightness and color gamut of the content. In this case, when the source device processes UHD video, the source device needs to deliver information about video processing that has been performed thereby and information about brightness and color gamut after video processing to the sink device. This is for the purpose of controlling post processing of the sink device. An embodiment of the aforementioned operation of the source device will now be described.

The source device may deliver UHD video processing related information to the sink device through InfoFrame defined in CEA 861 according to an embodiment of the present invention.

FIG. 11 is a table showing information delivered from the source device to the sink device according to an embodiment of the present invention.

Color gamut information from among InfoFrame defined in CEA 861 as interface information of the source device and the sink device may be delivered through AVI InfoFrame. In the present embodiment, the source device delivers information about UHD video processing to the sink device through InfoFrame. The source device can deliver video processing information such as brightness information, color gamut information and HDR information or WCG information of the UHD video to the sink device using InfoFrame. According to the present embodiment, the source device can deliver information about post processing that has been performed thereby, content brightness information after post processing, content brightness information before post processing and color gamut information to the sink device.

The information about post processing may include information about the state of the corresponding content and may be used as a response to a request of the sink device. The content brightness information after post processing may include lowest brightness information (black_luminance_level) of the content and highest brightness information (white_luminance_level) of the content. The content brightness information before post processing may include original lowest brightness information (orig_black_luminance_level) and original highest brightness information (orig_white_luminance_level). The color gamut information of the content is represented as orig_color_gamut information, which will be described in detail later.

InfoFrame type code indicates the type of InfoFrame. For example, when the InfoFrame type code is 0x07, this can indicate a frame including information about UHD video processing.

InfoFrame version number indicates version information of the frame and length of HDR InfoFrame indicates length information of HDR InfoFrame.

P3, P2, P1 and P0 fields of Data Byte 1 correspond to post_processing_type_flag and control (on/off) post processing performed by the source device. HDR information or WCG information related option information is described using the fields, which will be described in detail later.

R2, R1 and R0 fields of Data Byte 1 indicate reserved bits and E0 field thereof indicates whether a new color conversion function (e.g. EOTF) is used through new_EOTF_flag. The reserved bits correspond to a flag that can be used when a new EOTF appropriate for HDR information is defined later.

Data Byte 2 may include lowest brightness of the content. The lowest brightness is represented as black_luminance_level in FIG. 11. In the present embodiment, Data Byte 2 represents highest 8 bits of the lowest brightness.

The lowest brightness of the content can be represented in units of 0.0001 for the range of 0 to 0.05 in consideration of normal lowest brightness. That is, when physical brightness of a display is represented as brightness_black (cd/m$^2$), the physical brightness of the display and the lowest brightness of the content have the following relationship.

$$Brightness\_black = black\_luminance\_level \times 10000$$

$(0 \leq black\_luminance\_level \leq 500 < 2^9)$

For example, a reference monitor has minimum reference brightness of 0.05 cd/m$^2$ and can represent 500 obtained by multiplying the minimum reference brightness by 10000 (decimal) as brightness information.

Data Byte 3 may include the LSB of black_luminance_level and 7 bits of white_luminance_level, as shown in FIG. 11.

White_luminance_level is information for indicating highest brightness of the content and may be represented in units of 100 for the range of 100 to 10000 in consideration of normal highest brightness. That is, when physical brightness of a display is represented as brightness_black (cd/m$^2$), the physical brightness of the display and the highest brightness of the content have the following relationship.

$$Brightness\_white = white\_luminance\_level \times 100$$

$(1 \leq white\_luminance\_level \leq 100 < 2^7)$

For example, a reference monitor has highest reference brightness of 100 cd/m$^2$ and can represent 1 obtained by dividing the highest reference brightness by 100 (decimal) as brightness information.

Data Byte 4 can indicate highest 8 bits of orig_black_luminance_level of the content and Data Byte 5 can indicate the LSB of orig_black_luminance_level of the content and 7 bits of orig_white_luminance_level of the content.

Orig_black_luminance_level of the content indicates lowest brightness of the content prior to HDR processing performed by the source device. A method and range of representing orig_black_luminance_level correspond to those of black_luminance_level, and an option may be provided to this field such that orig_black_luminance_level is delivered only when HDR information is represented as "on" in post_processing_type in the present embodiment.

Similarly, orig_white_luminance_level of the content indicates highest brightness of the content prior to HDR processing performed by the source device. A method and range of representing orig_white_luminance_level correspond to those of white_luminance_level, and an option may be provided to this field such that orig_white_luminance_level is delivered only when HDR information is represented as "on" in post_processing_type in the present embodiment.

Data Byte 6 may include original color gamut information (orig_color_gamut) and S3, S2, S1 and S1 corresponding to reserved bits. Orig_color_gamut indicates a color gamut of the content prior to WCG processing of the source device. A standard color gamut will be described in detail later. An option may be provided to this field such that orig_color_gamut is delivered only when WCG is represented as "on" in post_processing_type in the present embodiment.

Data Byte 7 to Data Byte 16 are fields indicating color gamut information. In FIG. 11, color gamut information is represented by Red-x, Red-y, Green-x, Green-y, Blue-x, blue-y, White-x and White-y.

Here, Red-x represents a value in the range of 0 to 1, which corresponds to the x-coordinate of R color of a color space (e.g. CIE 1931), as binary. In the present embodiment, Red-x uses 10 bits and can use higher 8 bits of Data Byte 9 and higher 2 bits of Data Byte 6.

Red-y represents a value in the range of 0 to 1, which corresponds to the y-coordinate of R color of a color space (e.g. CIE 1931), as binary. In the present embodiment, Red-y uses 10 bits and can use higher 8 bits of Data Byte 10 and lower 2 bits of Data Byte 6.

When orig_color_gamut cannot represent appropriate information, the source device can deliver the color gamut information using Data Byte 7 to Data Byte 16.

In another embodiment of the present invention, the original color gamut information may be delivered using only information corresponding to Data Byte 7 to Data Byte 16 without using orig_color_gamut illustrated in FIG. 11. Alternatively, only when orig_color_gamut indicates a specific value, may the information corresponding to Data Byte 7 to Data Byte 16 be additionally used.

FIG. 12 is a table showing an example of post processing type information according to an embodiment of the present invention. As shown in FIG. 12, the source device can deliver display related information and color gamut information to the sink device through InfoFrame when the source device has post-processed a UHD video such that the UHD video is adapted to the sink device.

P3, P2, P1 and P0 fields of InfoFrame Data Byte 1 indicate post_processing_type and represent an option related to HDR information or WCG information. Post_processing_type is shown in FIG. 12.

For example, when post_processing_type is 0000, this indicates that the source device has not performed any processing. When post_processing_type is 0001, this indicates that the source device has performed dynamic range mapping.

When post_processing_type is 0010, this indicates that the source device has performed color gamut mapping.

When post_processing_type is 0011, this indicates that the source device has performed processing on the basis of information delivered from the sink device. 0011 may be used as an initial value.

Post_processing_type corresponding to 0110 to 1000 may be used for information exchange between the sink device and the source device for a multilayer video enhancement function in the future and post_processing_type corresponding to 1001 to 1111 may be used for user private.

FIG. 13 is a table showing original color gamut information orig_color_gamut according to an embodiment of the present invention.

When the source device has processed the UHD video such that the UHD video is adapted to the sink device, as described above, the source device can send orig_color_gamut of the corresponding content to the sink device.

An orig_color_gamut value of 0000 indicates that the original content colors conform to REC. 709 and an orig_color_gamut value of 0001 indicates that the original content colors conform to BT. 2020 NCL. Similarly, when orig_color_gamut is 0010, 0011, 0100 and 0101, this field indicates that the original content colors are defined according to xvYCC, DCI-P3, Adobe RGB and BT. 2020 DL, respectively.

FIG. 14 illustrates another example of delivering color information of an image from the source device to the sink device according to an embodiment of the present invention.

According to the present embodiment, post processing type information (post_processing_type_flag), color conversion function information (new_EOFT_flag) and brightness information (black_luminance_level or white_luminance_level) of an image which has been processed by the source device can be delivered to the sink device by extending the format of AVI InfoFrame version 3. Alternatively, the post processing type information (post_processing_type_flag), color conversion function information (new_EOFT_flag) and brightness information (black_luminance_level or white_luminance_level) of the image which has been processed by the source device can be delivered to the sink device using a new AVI InfoFrame defined in the interface of the source device and the sink device.

The source device can deliver information on the processed image to the sink device according to data bytes of the aforementioned AVI InfoFrame. In this example, Data Byte 14 to Data Byte 29 may respectively include information of Data Byte 1 to Data Byte 16 described above with reference to FIGS. 11, 12 and 13.

Therefore, according to the present invention, the source device can deliver information about post processing that has been performed thereby, content brightness information after post processing, content brightness information and color gamut information prior to post processing to the sink device.

Figure 15:
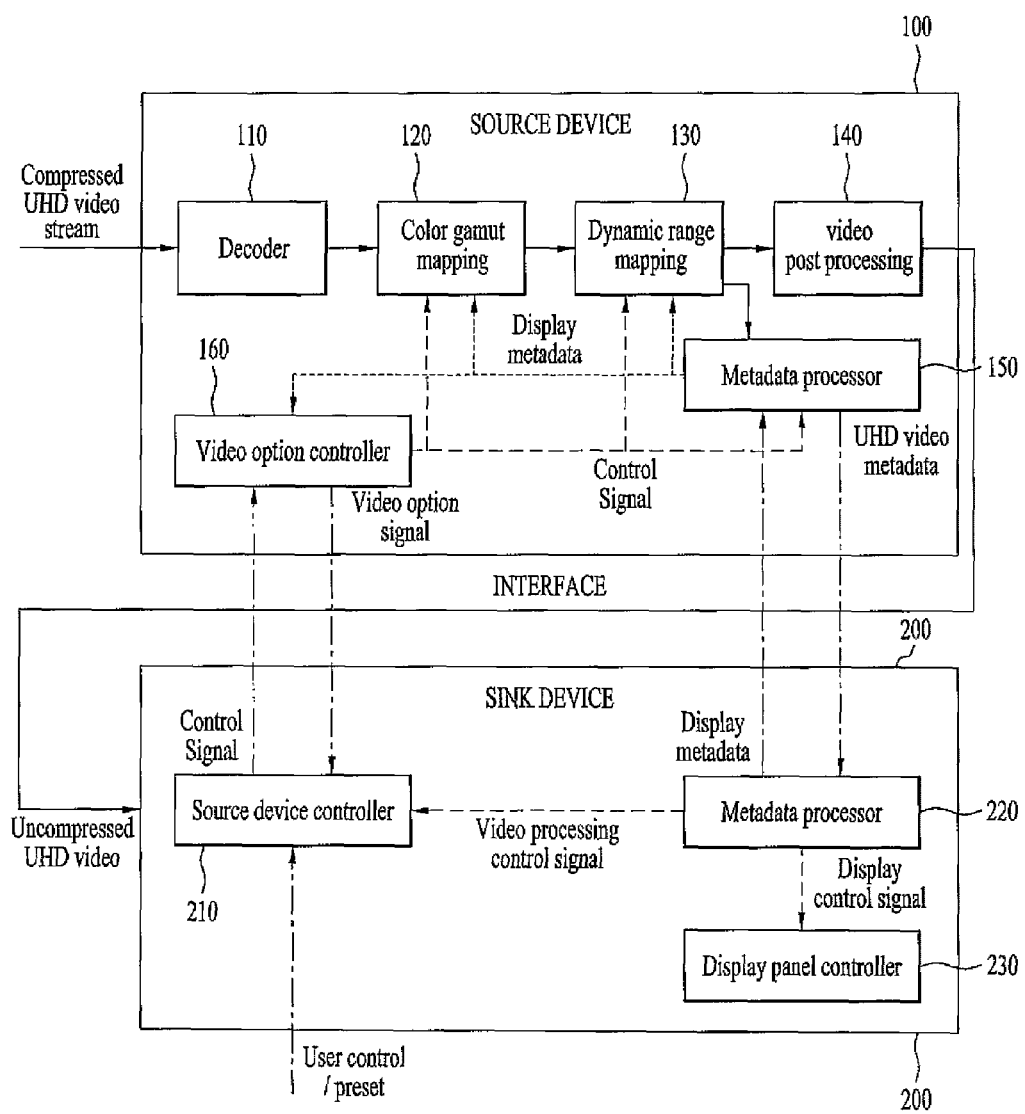
FIG. 15 is a block diagram of a source device and a sink device according to an embodiment of the present invention.

FIG. 15 illustrates a signal processing apparatus and operation thereof according to an embodiment of the present invention.

The signal processing apparatus according to an embodiment of the present invention includes a source device 100 and a sink device 200.

The source device 100 includes a decoder 110, a color gamut mapping unit 120, a dynamic range mapping unit 130, a post processing unit 140, a metadata processor 150 and an option controller 160.

The color gamut mapping unit 120, the dynamic range mapping unit 130 and the post processing unit 140 of the source device 100 may be called a video processing unit. The color gamut mapping unit 120, the dynamic range mapping unit 130 and the post processing unit 140 of the video processing unit may individually operate as necessary during video processing irrespective of previous blocks thereof.

The sink device 200 includes a source device controller 210, a metadata processor 220 and a panel controller 230. When the source device 100 is connected to the sink device 200 through an interface, information can be transmitted and received between the source device 100 and the sink device 200 according to the protocol shown in FIG. 3. Transmission and reception of information between the devices, which will be described below, are performed through the interface.

The source device 100 may decode an encoded UHD video stream, post-process the decoded UHD video or process the UHD video such that the UHD video is adapted to display capability of the sink device 200 as necessary, and provide the processed UHD video to the sink device.

The sink device 200 may receive the UHD video decoded by the source device 100 and display the UHD video. The sink device 200 provides information about the display capability thereof to the source device 100 so as to receive UHD video that can be displayed by the sink device 200 from the source device and to display the UHD video.

The option controller 160 of the source device 100 may request display related information by sending a video option signal to the sink device 200 through the interface between the source device 100 and the sink device 200. The display related information may include display color gamut information and display brightness related information. The video option signal delivered from the source device 100 to the sink device 200 may conform to the examples shown in FIGS. 11 to 14.

The metadata processor 150 of the source device 100 may send metadata about the UHD video to the sink device 100, and the sink device 200 may transmit metadata related to the corresponding display to the source device 100.

The decoder of the source device 100 may receive an encoded UHD video stream and decode the received encoded UHD video stream.

The color gamut mapping unit 120 maps color gamut information of the decoded UHD video. In this case, the color gamut mapping unit 120 may map and change the color gamut information of the UHD video using the display related information of the sink device 200 or on the basis of metadata included in the UHD video.

The dynamic range mapping unit 130 maps the dynamic range of the decoded UHD video. As described above, the dynamic range mapping unit 130 may map and change the dynamic range of the UHD video using the display related information of the sink device 200 or on the basis of the metadata included in the UHD video.

The post processing unit 140 may perform video post processing on the decoded UHD video. The post processing unit 140 may perform video post processing on the basis of the display related information.

The metadata processor 150 may send the metadata of the UHD video to the sink device 200 and receive display related metadata from the sink device 200.

The option controller 160 may send a video option signal to the sink device 200 and receive display option information from the sink device 200. The display option information delivered from the sink device 200 to the source device 200 has been described with reference to FIGS. 4 to 10. The video option signal delivered from the source device 100 to the sink device 200 may conform to the examples shown in FIGS. 11 to 14.

The source device controller 210 of the sink device 200 may send a control signal for controlling the source device 100 and receive a user control signal from a user.

The metadata processor 220 of the sink device 200 may receive the metadata of the UHD video from the source device 100 and send metadata related to the corresponding display device to the source device. The metadata processor 220 may send a video processing control signal to the source device controller 210 such that the source device controller 210 transmits a control signal.

The panel controller 230 may control the corresponding display panel according to a display control signal of the metadata processor 220.

The embodiments of the present invention enable video processing adapted to a display. That is, according to the embodiments of the present invention, information exchange between the source device and the sink device, video processing and display scheme depend on capability of the sink device 200. A detailed description will be given of an example in which metadata information of the sink device 200 is delivered to the source device 100, the source device 100 performs video processing on the basis of display related information and then the sink device 200 receives and outputs the video processed by the source device 100.

A first embodiment for a case in which the sink device 200 is a high-end UHD sink device is described first.

When the sink device 200 is a high-end UHD sink device, the sink device 200 can send display related metadata to the source device 100. Display related information may include display color gamut information (or color primary information corresponding to RGBW) and display brightness related information (e.g. peak luminance information and black luminance information). The metadata processor 220 of the sink device 200 can process the display related information. For example, the metadata processor 220 of the sink device 200 can store the display related information and refer to the display related information during content processing and display and may request the display related information to the source device 100 as necessary.

The source device 100 can deliver not only metadata related to display color and brightness but also a control signal of the source device 100 to the sink device 200 when sending the display related information to the sink device 200.

The control signal of the source device 100 can include information about video processing type that can be performed by the source device 100. The control signal of the source device 100 may be generated on the basis of a displayable color gamut delivered from the source device controller 210 of the sink device 200 or according to a default processing request without information delivered from the sink device 200.

While information exchange between the source device and the sink device is performed upon connection of the two devices, information exchange between the two devices may be re-performed when broadcast or streaming content is input while the source device and the sink device are connected, when content is changed or when a specific scene is changed.

When the sink device 200 is a high-end UHD sink device, video processing may be performed as follows.

The post processing unit 140 of the source device 100 may determine whether a decoded UHD video needs to be post-processed on the basis of display related information of the sink device 200, sent from the metadata processor 150, and output a control signal corresponding to the determination result. The source device 100 may perform video processing related to WCG information or HDR information of the UHD video, for example, color gamut mapping or dynamic range mapping. When the display capability of the sink device 200 is sufficient to play the UHD video after video post processing, the option controller 160 of the source device 100 can deliver information about the display capability of the sink device 200 to the post processing unit 140. When the WCG information or HDR information of the UHD video can be changed on the basis of the display color gamut information or brightness information of the sink device 200, the metadata processor 150 can send display related metadata to the color gamut mapping unit 120 or the dynamic range mapping unit 130.

The post processing unit 140 of the source device 100 may perform post processing using metadata transmitted along with the video, for example, a WCG SEI message or an HDR SEI message. If enhancement layer data is transmitted according to scalable coding, the video decoder 110 or the post processing unit 140 can decode the enhancement layer data to improve the definition of the output video.

While the definition of the output video may be additionally enhanced to be adapted to display resolution, the source device 100 can execute a definition improvement function thereof when additional information for video processing is not received from the sink device 200.

The metadata processor 150 delivers UHD video metadata including WCG information or HDR information of the decoded or post-processed video to the sink device 200. The option controller 160 can include processed video processing information in a video option signal and send the video option signal to the source device controller 210. The video option signal can conform to the examples shown in FIGS. 11 to 14.

If the video decoded by the decoder 110 is video suitable for the corresponding display device, the video may be delivered to the sink device 299 to be played without additionally processing the WCG information or HDR information of the video. In this case, the option controller 160 can signal that the video has not been processed.

The sink device 200 can display the UHD video through the display device. In this case, while the sink device 200 can play the video processed through the source device 100, the sink device 200 may determine whether the video delivered from the source device 100 has been processed to be adapted to the display device. The source device controller 210 of the sink device 200 can output a control signal to the source device 100. When the video has not been processed to be suitable for the display device, the source device controller 210 of the sink device 200 can determine a part of video processing of the source device 100, which causes video processing unsuitable for the display device, and control the corresponding video processing to be deactivated (off) through a control signal. This control function may be turned on/off at the request of the user. The sink device 200 may output a video processing option which can be processed or is being processed by the source device 100 to the user and provide a menu or an interface (UI) by which the video processing option can be controlled to the user.

When the sink device 200 has a function of controlling brightness and colors of the display device, the sink device 200 may analyze information of the metadata processor 220 thereof and then adjust the display device through the panel controller 230 to provide a playback environment suitable for the corresponding content.

A description will be given of a second embodiment for a case in which the sink device 200 is a conventional UHD sink device. Part of the second embodiment, which corresponds to the first embodiment, conforms to the first embodiment.

The sink device 200 sends metadata about the conventional UHD sink device to the source device 100. The metadata about the conventional UHD sink device may include display color gamut information (or color primary information corresponding to RGBW) and display brightness related information (e.g. peak luminance information and black luminance information). The metadata processor 150 of the source device 100 may receive and process the metadata about the conventional UHD sink device.

The option controller 160 of the source device determines whether to perform post processing on the decoded UHD video on the basis of the display related information acquired by the metadata processor 150 and outputs a control signal.

If capabilities of the corresponding display device do not reach definition (color and brightness) that can be expressed by the video, the video can be appropriately processed such that the video has colors and brightness that can be expressed by the display device. For example, the color gamut mapping unit 120 or the dynamic range mapping unit 130 of the source device 100 can map the color gamut information or dynamic range information of the UHD video to information suitable for the display device.

The source device 100 may change the colors and brightness of the video on the basis of metadata included in the corresponding video data, for example, a WCG SEI message, an HER SEI message or the like or according to the function thereof. If the WCG information or HDR information of the video data has been changed, the option controller 160 may include the changed WCG information or HDR information in a video option signal and send the video option signal to the sink device 200. The video option signal may conform to the examples shown in FIGS. 11 to 14.

When the brightness and color gamut of the display device of the sink device 200 can support the brightness and color gamut of the video, the source device 100 can send the video to the sink device 200 without additional processing. In addition, the option controller 160 of the source device 100 can deliver information representing that the metadata, WCG information or HDR information of the UHD video has not been processed to the sink device 200 through the video option signal.

The display device of the sink device 200 can play the UHD video. Upon determining that the WCG information or HDR information of the UHD video received by the sink device 200 is not suitable for the display device of the sink device 200, the source device controller 210 can deliver a control signal corresponding to the determination result to the source device 100. The user may control functions related to the display device through the user menu or interface (UI).

Figure 16:
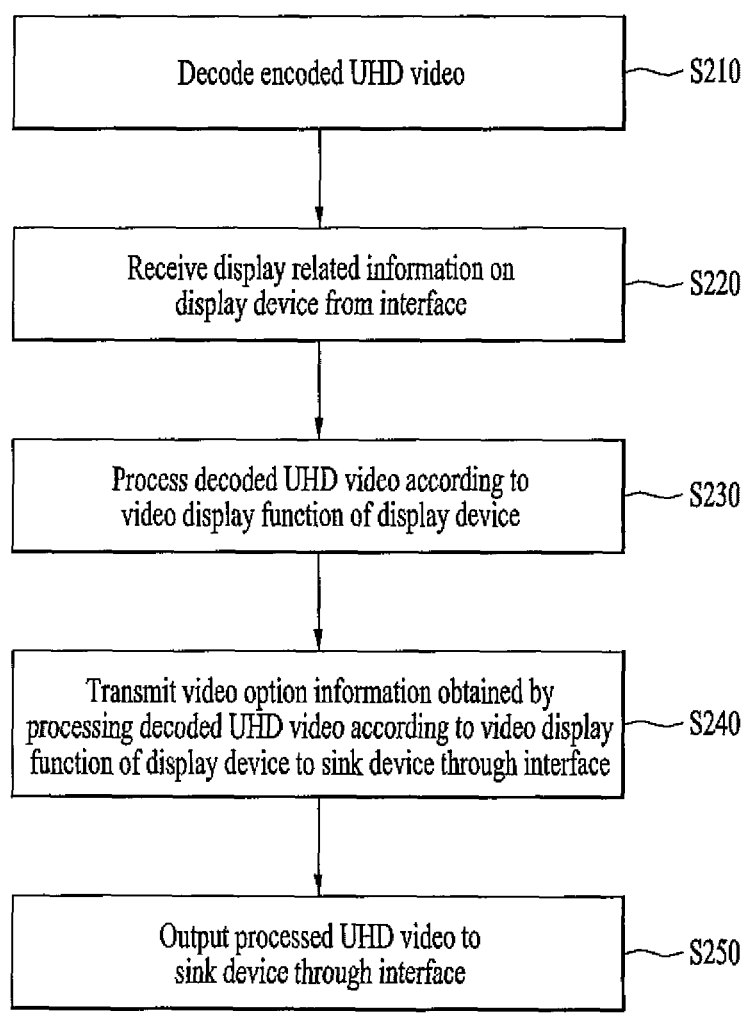
FIG. 16 is a flowchart illustrating a video processing method according to another embodiment of the present invention.

FIG. 16 is a flowchart illustrating a video processing method according to another embodiment of the present invention.

A description will be given of a video processing method of the source device according to an embodiment of the present invention.

Encoded UHD video is decoded (S210).

Display related information about a display device is received from the interface (S220). The display related information is information about a video display function of the display device and may include color gamut information or brightness related information of the display device.

The decoded UHD video is processed according to the video display function of the display device (S230).

When the decoded UHD video is processed according to the video display function of the display device, color gamut information of the decoded UHD video may be changed, dynamic range information of the decoded UHD video may be changed or other types of post processing may be performed.

A video option signal obtained by processing the decoded UHD video according to the video display function of the display device is sent to the sink device through the interface (S240). An example of the video option signal has been illustrated in FIGS. 11 to 14.

The processed UHD video is output to the sink device through the interface (S250).

The video processing method according to the present embodiment may receive a display option signal according to the display function of the display device, which is not shown. An example of the display option signal has been illustrated in FIGS. 4 to 10 and other examples have been described.

Processing of changing the display related information of the decoded UHD video, as described in S230, may be performed according to control information.

Therefore, according to the aforementioned embodiments, content including UHD content can be viewed through various display devices under an optimal environment. In addition, when UHD content is displayed through various display devices, restrictions on colors or brightness can be reduced according to physical characteristics of the display devices. Furthermore, even when UHD content is provided through a device outside of a display, device characteristics of the display can be delivered such that content including the UHD video can be viewed under an optimal environment.

MODE FOR INVENTION

Various embodiments have been described in the best mode for carrying out the invention.

INDUSTRIAL APPLICABILITY

The present invention is applicable to broadcast and video signal processing, and is reproducible and industrially applicable.

The invention claimed is:

1. A video processing method for a sink device, the video processing method comprising:
   transmitting, by a metadata processor to a source device through an interface, display related information including a high dynamic range (HDR) data block;
   receiving, by a source device controller, video option information including a type of information frame for HDR,
   wherein the type of information frame includes Electro Optical Transfer Function (EOTF) information for identifying an EOTF used in the video data,
   wherein the EOTF information indicates one of plural EOTFs,
   wherein the type of information frame further includes a number of data bytes,
   wherein the data bytes include values for color primaries, respectively, and
   wherein the values for the color primaries are represented as an xy chromaticity coordinate for displaying the video content;
   after a video content is processed by the source device, receiving, by a display panel controller, the processed video content through the interface; and
   displaying, by the display panel controller, the received video content on a display device based on the color primaries for displaying the video content.

2. The video processing method according to claim 1, wherein the video content includes ultra high definition (UHD) video data.

3. The video processing method according to claim 1, wherein the type of information frame further includes information on a maximum content brightness level of the video content.

4. A video processing apparatus, comprising:
   a metadata processor configured to transmit to a source device through an interface, display related information;
   a source device controller configured to receive video option information including a type of information frame for HDR,
   wherein the type of information frame includes Electro Optical Transfer Function (EOTF) information for identifying an EOTF used in the video data,
   wherein the EOTF information indicates one of plural EOTFs,
   wherein the type of information frame further includes a number of data bytes,
   wherein the data bytes include values for color primaries, respectively, and
   wherein the values for the color primaries are represented as an xy chromaticity coordinate for displaying the video content; and
   a display panel controller configured to:
      after the video content is processed by the source device, control the video content received through the interface, and
      control the received video content to be displayed on a display device based on the color primaries for displaying the video content.

5. The video processing apparatus according to claim 4, wherein the video content includes ultra high definition (UHD) video data.

6. The video processing apparatus according to claim 4, wherein the type of information frame further includes information on a maximum content brightness level of the video content.

7. A video processing method for a source device, the video processing method comprising:
   decoding, by a decoder, an encoded video content;
   receiving, by a metadata processor, display related information on a display device through an interface,
   wherein the display related information includes a high dynamic range (HDR) data block and the HDR data block;
   processing, by a video processor, the decoded video content according to a video display function of the display device; and
   transmitting, by an option controller to a sink device, video option information including a type of information frame for HDR,
   wherein the type of information frame includes Electro Optical Transfer Function (EOTF) information for identifying EOTF used in the video data,
   wherein the EOTF information indicates one of plural EOTFs,
   wherein the type of information frame further includes a number of data bytes, wherein the data bytes include values for color primaries, respectively, and wherein the values for the color primaries are represented as an xy chromaticity coordinate for displaying the video content.

8. The video processing method according to claim 7, wherein the display related information includes the video content including ultra high definition (UHD) video data.

9. The video processing method according to claim 7, wherein the type of information frame includes information on a maximum content brightness level of the video content.

10. A video processing apparatus, comprising:
a decoder configured to decode an encoded video content;
a metadata processor configured to receive display related information on a display device through an interface, wherein the display related information includes a high dynamic range (HDR) data block and the HDR data block;
a video processor configured to process the decoded video content according to a video display function of the display device; and
an option controller configured to transmit video option information to a sink device, the video option information including a type of information frame for HDR, wherein the type of information frame includes Electro Optical Transfer Function (EOTF) information for identifying an EOTF used in the video data, wherein the EOTF information indicates one of plural EOTFs, wherein the type of information frame further includes a number of data bytes;

wherein the data bytes include values for color primaries, respectively, and wherein the values for the color primaries are represented as an xy chromaticity coordinate for displaying the video content.

11. The video processing apparatus, according to claim 10, wherein the type of information frame further includes information on a maximum content brightness level of the video content.

* * * * *